US006819980B2

(12) United States Patent
Bauer et al.

(10) Patent No.: US 6,819,980 B2
(45) Date of Patent: Nov. 16, 2004

(54) METHOD FOR THE AVOIDANCE OF ROLLOVER PHENOMENA IN SEMITRAILERS

(75) Inventors: Wolf-Deitrich Bauer, Stuttgart (DE); Christian Michael Mayer, Desa Wanaherang-Jakarta (ID); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/176,399

(22) Filed: Jun. 21, 2002

(65) Prior Publication Data

US 2003/0050741 A1 Mar. 13, 2003

(30) Foreign Application Priority Data

Jun. 23, 2001 (DE) .......................... 101 30 407

(51) Int. Cl.$^7$ ................................. G05D 1/00
(52) U.S. Cl. ................ 701/1; 701/48; 701/70; 701/72; 701/78; 701/83; 701/92; 701/93; 701/37; 701/38; 701/39; 180/82; 180/170; 280/170; 280/446.1; 303/155; 303/431
(58) Field of Search ................ 701/1, 48, 70, 701/78, 83, 37–39, 72, 92, 93; 180/82, 170; 280/446.1; 303/155; 340/431

(56) References Cited

U.S. PATENT DOCUMENTS

| 5,747,683 A | * | 5/1998 | Gerum et al. ............... 73/118.1 |
| 6,324,447 B1 | | 11/2001 | Schramm et al. .............. 700/1 |
| 2002/0095251 A1 | * | 7/2002 | Oh et al. ....................... 701/70 |
| 2003/0058118 A1 | * | 3/2003 | Wilson ....................... 340/679 |

OTHER PUBLICATIONS

Ma et al., Worst–case manoeuvres for the roll–over adn jackkknife or articulated vehicles, 1998, IEEE, 2263–2267, pp. 2263–2267.*

* cited by examiner

*Primary Examiner*—Thomas G. Black
*Assistant Examiner*—McDieunel Marc
(74) *Attorney, Agent, or Firm*—Crowell & Moring LLP

(57) ABSTRACT

In a method for the avoidance of rollover phenomena in semitrailers with the emission of warning signals for the driver of the vehicle when driving inappropriately, the center of gravity of the load of the semitrailer is calculated in an on-board computer. From the center of gravity thus determined and the known weight of the loaded semitrailer, the on-board computer calculates a rollover limit as a function of instantaneous driving parameters, on exceeding of which limit a warning is issued to the driver of the vehicle.

10 Claims, 1 Drawing Sheet

METHOD FOR THE AVOIDANCE OF ROLLOVER PHENOMENA IN SEMITRAILERS

This application claims the priority of German Application No. 101 30 407.2, filed Jun. 23, 2001, the disclosure of which is expressly incorporated by reference herein.

BACKGROUND AND SUMMARY OF THE INVENTION

The invention relates to a method for the avoidance of rollover phenomena in semitrailers, with the emission of warning signals for the driver of the vehicle when driving inappropriately.

Known rollover protection methods on semitrailers are based on the principle of performing brief test brakings—so-called "test-brake inshots"—on the wheels on both sides of the semitrailer continuously while in motion, and measuring the accelerations of the wheels during these test brakings. With the wheels lifted, excessively high wheel accelerations are measured by the test brakings—in much the same way as in known ABS brake control—from which a rollover condition of the semitrailer is inferred, resulting in an automatic warning to the driver of the vehicle.

These methods have the disadvantage, however, that they detect whether the wheels have already lifted. It is then often already too late to initiate rollover protection measures. The fact that a large amount of wear occurs in the brake system due to the test brakings that continuously have to be performed is to be seen as a further disadvantage.

The object of the invention is to create a rollover protection method which predicts the onset of rollover in semitrailers before lifting of the wheels occurs and which can be performed without test brakings.

According to the invention, this object is achieved by the emission of warning signals for the driver of the vehicle when driving inappropriately. For this purpose, the center of gravity of the load of the semitrailer is calculated in an on-board computer, and is used, together with the known weight of the loaded semitrailer, to calculate a rollover limit as a function of instantaneous driving parameters in the on-board computer. When the vehicle exceeds this limit, a warning is issued to the driver. Developments of the invention are specified herein.

The method according to the invention is based on the principle that the position of the center of gravity of the semitrailer is determined for an existing load, and used together with the measured, instantaneous lateral acceleration of the trailer—or alternatively with the measured road speed and the measured lock angle of the front wheels—to calculate a limit for the lateral acceleration of the trailer or alternatively for the road speed at a given lock angle, up to which any onset of rollover is safely avoided. If this rollover limit is exceeded, the driver is warned and/or automatic intervention in the control of the vehicle is undertaken.

The solution according to the invention advantageously allows the rollover to be predicted and reduces the brake system wear, since no test brakings have to be performed.

Other objects, advantages and novel features of the present invention will become apparent from the following detailed description of the invention when considered in conjunction with the accompanying drawings.

DETAILED DESCRIPTION OF THE EMBODIMENT

Figure 1:
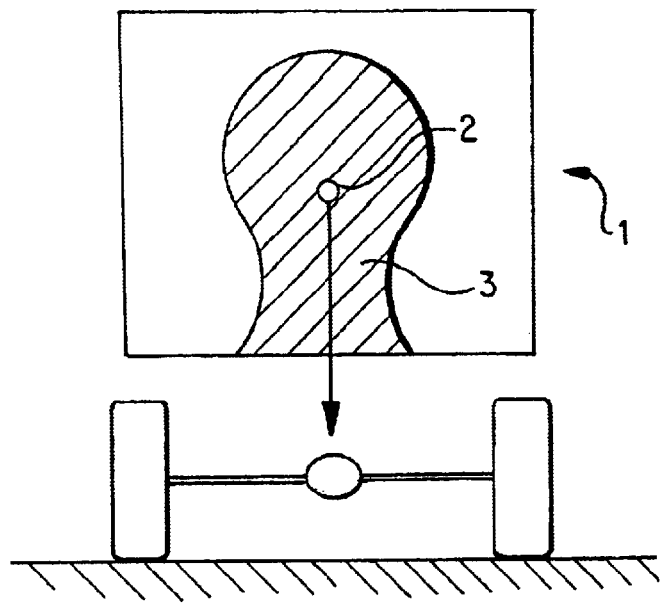
FIG. 1 shows a loaded semitrailer with an uneven but secure weight distribution of the load.

According to the invention, the position of the center of gravity 2 of the loaded semitrailer 1 shown in FIG. 1 is calculated from the estimated weight of the load in the trailer, assuming an uneven weight distribution. In the case of uneven weight distributions—as indicated, for example, in FIG. 1—a more precise determination of the position of the center of gravity may alternatively be undertaken, if information on the weight distribution is available. It may be possible to infer such information from electronic waybills, for example.

The determination of the center of gravity may be based on a stowage plan and known density of the cargo and may be calculated by hand or by any suitable manual or automated method. The type of cargo and its form may be determined from a chip card or the like.

Figure 2:
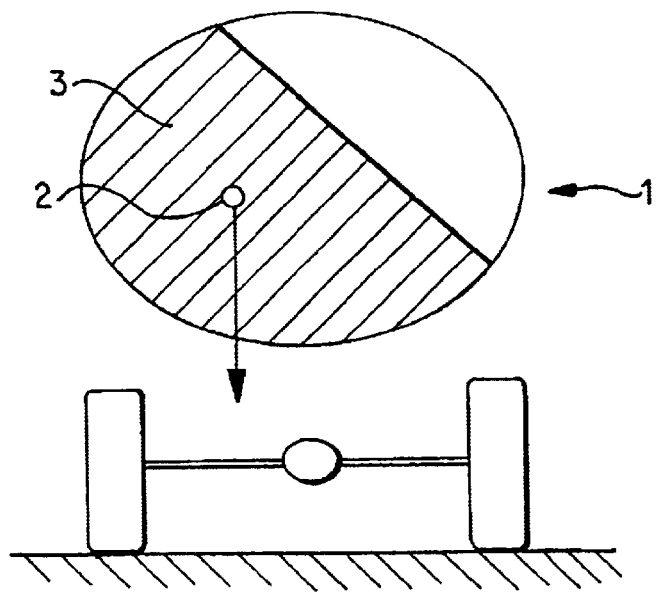
FIG. 2 shows a loaded semitrailer with center of gravity of a moveable load varying as a function of the instantaneous lateral acceleration of the trailer.

The position of the center of gravity of the loaded semitrailer—such as the semitrailer of a tanker vehicle, for example—shown in FIG. 2, varies with the instantaneous lateral acceleration of the trailer.

The method according to the invention for determining the rollover limit must therefore take account of the instantaneous position of the center of gravity. At the same time, the calculation either takes additional account of the measured instantaneous lateral acceleration of the trailer, or, alternatively, of the measured road speed and the measured steering angle. A method for calculating the shift of the center of gravity is disclosed in U.S. Pat. No. 6,324,447, to Schramm et al., the disclosure of which is incorporated by reference.

The calculation of the rollover limit may be performed, for example, by means of a suitable characteristics curve method, into which the data obtained on the load center of gravity and the lateral acceleration of the trailer—or the road speed and the steering angle—are introduced as input variables. Suitable characteristic curves may be determined by way of experiments or by use of algorithms.

The rollover limit may be calculated as a maximum admissible lateral acceleration of the trailer or as a maximum admissible road speed for a given wheel lock angle.

These driving parameters are continuously registered by corresponding sensors on the vehicle, and the driver is warned if the determined rollover limit is exceeded.

Alternatively, should the limits be exceeded, the method according to the invention may intervene automatically in the kinematics of the vehicle and, for example, reduce the road speed for a given steering angle, so that the rollover limit is not exceeded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the avoidance of rollover phenomena in a semitrailer with the emission of warning signals for a driver of said semitrailer when driving inappropriately, wherein a center of gravity of a load of the semitrailer is calculated in an on-board computer and, from said center of gravity, thus determined, and a known weight of said semitrailer, said on-board computer calculates a rollover limit as a function of instantaneous driving parameters, on exceeding of which limit a warning is issued to said driver of said semitrailer, wherein a steering angle and a road speed are continuously determined by methods of measurement, and, in said on-board computer, said steering angle and said road speed are compared with said rollover limit determined as maximum admissible road speed for said steering angle.

2. A method for the avoidance of rollover phenomena in a semitrailer with the emission of warning signals for a driver of said semitrailer when driving inappropriately, wherein a center of gravity of a load of the semitrailer is calculated in an on-board computer and, from said center of gravity, thus determined, and a known weight of said semitrailer, said on-board computer calculates a rollover limit as a function of instantaneous driving parameters, on exceeding of which limit a warning is issued to said driver of said semitrailer, wherein, in addition to emission of warning signals, a speed of said semitrailer is automatically reduced by actuators activated according to said on-board computer, if said rollover limit is exceeded.

3. A method for avoiding rollover in a semitrailer, comprising:
   calculating a rollover limit as a function of driving parameters; and
   emitting a warning when said semitrailer exceeds said rollover limit;
   wherein said driving parameters comprise a lateral acceleration of said semitrailer, and
   wherein said rollover limit is determined by comparing said lateral acceleration to a maximum admissible lateral acceleration of said semitrailer.

4. A method for avoiding rollover in a semitrailer, comprising:
   calculating a rollover limit as a function of driving parameters; and
   emitting a warning when said semitrailer exceeds said rollover limit;
   wherein said driving parameters comprise a steering angle and a road speed of said semitrailer.

5. The method of claim 4, wherein said rollover limit is determined by comparing said road speed to a maximum admissible road speed of said semitrailer, wherein said maximum admissible road speed is a function of said steering angle.

6. A method for avoiding rollover in a semitrailer, comprising:
   calculating a rollover limit as a function of driving parameters;
   emitting a warning when said semitrailer exceeds said rollover limit; and
   reducing a speed of said semitrailer when said semitrailer exceeds said rollover limit.

7. A method for avoiding rollover in a semitrailer, comprising:
   determining a center of gravity of a load in said semitrailer;
   calculating a rollover limit as a function of driving parameters of said semitrailer, and of said center of gravity; and
   emitting a warning when said semitrailer exceeds said rollover limit;
   wherein said rollover limit is determined by comparing said lateral acceleration to a maximum admissible lateral acceleration of said semitrailer.

8. A method for avoiding rollover in a semitrailer, comprising:
   determining a center of gravity of a load in said semitrailer;
   calculating a rollover limit as a function of driving parameters of said semitrailer, and of said center of gravity; and
   emitting a warning when said semitrailer exceeds said rollover limit;
   wherein said driving parameters comprise a steering angle and a road speed of said semitrailer.

9. A method for avoiding rollover in a semitrailer, comprising:
   determining a center of gravity of a load in said semitrailer;
   calculating a rollover limit as a function of driving parameters of said semitrailer, and of said center of gravity; and
   emitting a warning when said semitrailer exceeds said rollover limit;
   wherein said rollover limit is determined by comparing said road speed to a maximum admissible road speed of said semitrailer, wherein said maximum admissible road speed is a function of said steering angle.

10. A method for avoiding rollover in a semitrailer, comprising:
   determining a center of gravity of a load in said semitrailer;
   calculating a rollover limit as a function of driving parameters of said semitrailer, and of said center of gravity;
   emitting a warning when said semitrailer exceeds said rollover limit; and
   reducing a speed of said semitrailer when said semitrailer exceeds said rollover limit.

* * * * *